J. E. LAPPEN.
ELECTRIC COOKER.
APPLICATION FILED FEB. 20, 1917.

1,332,221.

Patented Mar. 2, 1920.

WITNESSES:
B. Hall.
E. A. Paul.

INVENTOR:
JAMES E. LAPPEN
BY
Paul & Paul
ATTORNEYS:

UNITED STATES PATENT OFFICE.

JAMES E. LAPPEN, OF WINONA, MINNESOTA.

ELECTRIC COOKER.

1,332,221.  Specification of Letters Patent.  Patented Mar. 2, 1920.

Application filed February 20, 1917. Serial No. 149,741.

*To all whom it may concern:*

Be it known that I, JAMES E. LAPPEN, a citizen of the United States, resident of Winona, county of Winona, State of Minnesota, have invented certain new and useful Improvements in Electric Cookers, of which the following is a specification.

The object of my invention is to provide a cooker of simple, economical construction, one which will be accessible for renewal or cleaning and designed particularly as an improvement over the cooker shown and described in Letters Patent of the United States No. 1,122,131, issued December 22, 1914.

A further object is to provide a cooker having provision for heating a kettle thereon and provided with a top which when the kettle burners are not in use, may be utilized as a table.

The invention consists generally in various constructions and combinations, all as hereinafter described and particularly pointed out in the claims.

Figure 1:
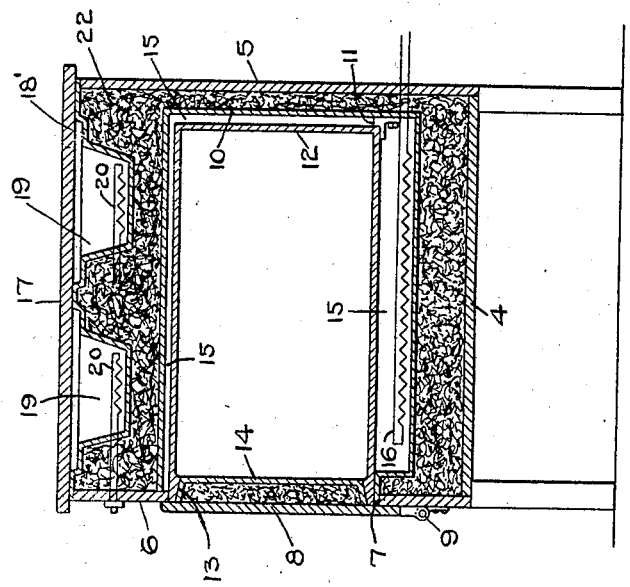
Figure 2:
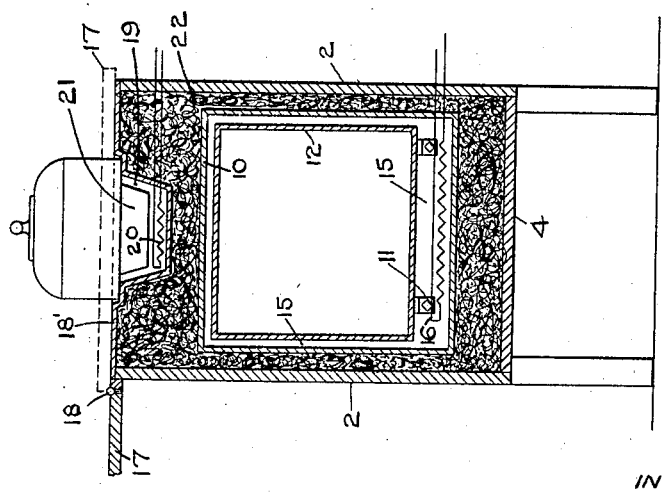

In the accompanying drawings forming part of this specification,

Figure 1 is a vertical sectional view through an electric cooker embodying my invention, Fig. 2 is a similar view, taken on a section line at right angles to the section line of Fig. 1.

In the drawing, 2 represents the side walls, 4 the bottom and 5 the rear end wall of the cooker. The front wall 6 has an opening 7 therein covered by a door 8 that is hinged at 9. Within the cooker I provide a metallic shell or casing 10 open at one end and encircling the opening 7 in the wall of the cooker and seated against the end wall 6. Brackets 11 are mounted on the rear end wall of the shell 10 and form seats for an oven 12 which is fitted into said shell through the opening 7 and may freely slide in said opening to insert the oven into the cooker or remove it therefrom.

The open end of the oven is provided with beveled surfaces 13 and the door 8 has a projection 14 formed on its inner surface to fit into the open end of the oven and be seated against the surfaces 13, thereby forming a close, tight joint between the door and the oven walls. A space 15 is formed around the oven, separating it from the shell 10, to allow the free circulation of air entirely around the oven, and an electric heating coil 16 is mounted in the wall of the shell, projecting beneath the oven for heating its walls and the space in which the oven is mounted. The heat is so distributed from the coil that the walls of the oven will be uniformly heated and a roast of meat or other article that is being cooked will be subjected to a uniform temperature throughout the cooking operation. Whenever desired, the door 8 may be opened and the oven entirely removed from the cooker.

On the top of the cooker I provide a plate 17 hinged at 18 and adapted to swing upwardly and downwardly to a position at one side of the cooker to expose a plate 18' having kettle holes 19 therein and electric coils or other similar devices 20 beneath said holes for heating or cooking the contents of a kettle which may be seated on the cooker. The lower portion of the kettle 21 will depend through the opening to a point near the electric heating device and enable the user of the cooker to boil water or cook any article of food which may be placed in the kettle.

The space beneath the top of the cooker and the shell of the oven and all around the oven outside the shell is packed with a suitable non-heat conducting substance 22, such as asbestos.

When it is desired to place a kettle on the cooker, the top 17 is lifted and tilted over to one side, exposing the kettle holes, and when the top is not in use, the kettle may be removed and the top swung back to the position shown in Fig. 1, where the cooker may be utilized as a table.

I claim as my invention:

1. An electric cooker comprising a casing having a top provided with a kettle hole and a depending wall encircling said hole and forming a recess in the top of the cooker, an insulating material provided within said casing around said depending wall, the upper portion of said wall having a seat for a cooking utensil, said recess receiving the depending portion of the bottom of the utensil, a circulating space being provided between said depending portion and the wall of said recess, an electric heating means projecting across said recess for heating the space in said recess between its walls and said kettle.

2. An electric cooker comprising a casing having a top provided with kettle holes and depending walls encircling said holes, an electric heating means mounted beneath said holes, and a plate hinged on one side and adapted to be swung outwardly to expose said kettle holes and form a shelf or rest upon the top of said cooker and conceal said holes and the top of said cooker and form a table top.

3. An electric cooker comprising a casing, a metallic plate for the top of said casing having a kettle hole therein and a wall encircling said hole and depending within said casing and having a closed bottom and forming a recess into which the lower portion of the kettle depends, an insulating packing filling the space between said wall and the walls of said casing, an electric heating means projecting through said wall near said closed bottom, the upper portion of said wall forming a seat for a kettle, an unobstructed heat circulating space being formed between the bottom of the kettle and said wall and said heating means being adjacent the bottom of the kettle seated on said wall.

4. An electric cooker comprising a casing, a metallic plate forming the top of said casing and having kettle holes therein and walls encircling said holes and depending within said casing and having closed bottoms and forming recesses into which the lower portions of the kettles seated on said walls depend, an insulating packing filling the space between said walls and the wall of said casing, electric heating means projecting through said walls and near the closed bottoms of said recesses, unobstructed heat circulating spaces being formed around the bottoms of the kettles within said recesses and between them and said walls.

In witness whereof, I have hereunto set my hand this 13th day of February 1917.

JAMES E. LAPPEN.